(12) United States Patent
Arslan et al.

(10) Patent No.: US 6,574,235 B1
(45) Date of Patent: Jun. 3, 2003

(54) METHODS OF RECEIVING CO-CHANNEL SIGNALS BY CHANNEL SEPARATION AND SUCCESSIVE CANCELLATION AND RELATED RECEIVERS

(75) Inventors: Hüseyin Arslan, Durham, NC (US); Karl James Molnar, Cary, NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/373,406

(22) Filed: Aug. 12, 1999

(51) Int. Cl.$^7$ ................................................. H04J 15/00
(52) U.S. Cl. ........................ 370/464; 370/201; 370/334; 375/267; 375/349
(58) Field of Search ................................. 370/464, 465, 370/467, 334, 328, 201, 202, 342, 252, 335; 375/285, 316, 346, 341, 260, 340, 265, 267, 262, 347, 349

(56) References Cited

U.S. PATENT DOCUMENTS

| 5,418,814 | A | * | 5/1995 | Hulbert | 370/342 |
| 5,644,592 | A | * | 7/1997 | Divsalar et al. | 375/147 |
| 5,748,677 | A | * | 5/1998 | Kumar | 375/285 |
| 5,771,288 | A | * | 6/1998 | Dent et al. | 380/270 |
| 6,304,618 | B1 | | 10/2001 | Hafeez et al. | 375/341 |
| 6,370,397 | B1 | * | 4/2002 | Popovic et al. | 455/561 |

FOREIGN PATENT DOCUMENTS

| EP | 0 491 688 A2 | * | 6/1992 | H04J/13/00 |

OTHER PUBLICATIONS

Gardner, William A., *Cyclic Wiener Filtering: Theory and Method*, IEEE Transactions on Communications, vol. 41, No. 1, pp. 151–163 (Jan. 1993).

Kohno, Ryuji, et al., *Combination of an Adaptive Array Antenna and a Canceller of Interference for Direct–Sequence Spread–Spectrum Multiple–Access System*, IEEE Journal on Selected Areas in Communications, vol. 8, No. 4, pp. 675–681 (May 1990).

Yoshino, Hitoshi, et al., *Interference Cancelling Characteristics of DFE Transversal–Combining Diversity in Mobile Radio Environment—Comparisons with Metric–Combining Schemes*, Electronics and Communications in Japan, Part 1, vol. 77, No. 9, pp. 85–98 (1994).

Winters, Jack H., *Optimum Combining for Indoor Radio Systems with Multiple Users*, IEEE Transactions on Communications, vol. COM–35, No. 11, pp. 1222–1230 (Nov. 1987).

Medepalli, Kameswara R., et al., *Combined Equalization and Cochannel Interference Cancellation for the Downlink Using Tentative Decisions* (1999).

* cited by examiner

*Primary Examiner*—Dang Ton
*Assistant Examiner*—Tri Phan
(74) *Attorney, Agent, or Firm*—Myers Bigel Sibley & Sajovec (57) ABSTRACT

A method for receiving a plurality of communications from a respective plurality of transmitters using a common carrier frequency includes receiving a plurality of information signals on a common carrier frequency corresponding to the plurality of communications from the plurality of transmitters, and generating first and second separated signals corresponding to respective first and second ones of the information signals so that the first separated signal includes a primary component corresponding to the first information signal and so that the second separated signal includes a primary component corresponding to the second information signal. The first separated signal is demodulated to provide an estimate of a first information sequence corresponding to the first information signal, and the estimate of the first information sequence is modulated to provide a modulated estimate of the first information sequence. The modulated estimate of the first information sequence is subtracted from the second separated signal to provide an improved second separated signal. The improved second separated signal is demodulated to provide an estimate of a second information sequence corresponding to the second information signal. Related receivers are also discussed.

51 Claims, 5 Drawing Sheets

METHODS OF RECEIVING CO-CHANNEL SIGNALS BY CHANNEL SEPARATION AND SUCCESSIVE CANCELLATION AND RELATED RECEIVERS

FIELD OF THE INVENTION

The present invention relates to the field of communications and more particularly to communications methods and receivers.

BACKGROUND OF THE INVENTION

Due to the limited availability of the signal spectrum, cellular radiotelephone systems have been developed wherein carrier frequencies are re-used in distant cells to increase spectral efficiency. Because of this frequency reuse, however, co-channel interference may be present at both mobile terminals and base stations. In response, there have been efforts to develop signal enhancing receivers to reduce the effects of co-channel interference. For example, see the reference by Medepalli et al. entitled "Combined Equalization And CoChannel Interference Cancellation For The Downlink Using Tentative Decisions" (IEEE 1999) the disclosure of which is hereby incorporated herein in its entirety by reference.

The effects of co-channel interference (CCI) can conventionally be reduced by providing signal separation in the transmission of different signals. Cochannel signal separation is conventionally provided in an FDMA system by providing physical separation between two transmitters using the same carrier frequency and between the respective receiving base stations. Accordingly, a first signal is received by the first base station at a significantly higher strength than a second signal, and the second signal is received by the second base station at a significantly higher strength than the first signal. As cell sizes are reduced to provide greater capacity, however, the differences in signal strengths may be reduced making it difficult to receive one or both co-channel signals. Interference from signals transmitted on adjacent carrier frequencies (adjacent channel interference or ACI) can be accommodated by filtering the carrier frequency of interest.

In CDMA systems, signal separation is provided during transmission by correlating a first signal with a first spreading code and correlating the second signal with a second spreading code. The two signals can then be separated by decorrelating the desired signal with the respective spreading code. In other words, channel separation is provided during transmission through the use of different spreading codes.

The reception of co-channel signals without prior signal channel separation during transmission, however, may be difficult. Accordingly, there continues to exist a need for methods and receivers that can receive multiple information signals over a common carrier frequency.

SUMMARY OF THE INVENTION

It is therefore an object of the present invention to provide improved methods for receiving information signals and related receivers.

It is another object of the present invention to provide methods and receivers that can receive multiple information signals over a common carrier frequency wherein the multiple information signals are transmitted on the common carrier frequency without significant channel separation.

It is still another object of the present invention to provide methods and receivers that can receive multiple information signals over a common carrier frequency wherein the multiple information signals have common signal strengths.

These and other objects can be provided according to the present invention by providing some degree of signal separation at the receiver followed by successive cancellation. The signal separation, for example, can be provided by using spatial and/or temporal processing of co-channel signals, by using cyclostationary properties of the co-channel signals, or by using coding and decoding.

According to a first aspect of the present invention, a plurality of communications are received from a respective plurality of transmitters using a common carrier frequency. In particular, a plurality of information signals are received on a common carrier frequency corresponding to the plurality of communications from the plurality of transmitters. First and second separated baseband signals are generated corresponding to respective first and second ones of the information signals so that the first separated baseband signal includes a primary component corresponding to the first information signal and so that the second separated baseband signal includes a primary component corresponding to the second information signal. The first separated baseband signal is demodulated to provide an estimate of a first information sequence corresponding to the first information signal. The estimate of the first information sequence is modulated to provide a modulated estimate of the first information sequence, and the modulated estimate of the first information sequence is subtracted from the second separated baseband signal to provide an improved second separated baseband signal. The improved second separated baseband signal is then demodulated to provide an estimate of a second information sequence corresponding to the second information signal.

Moreover, the estimates of the first and second information sequences can be processed to reproduce the first and second communications. By providing the separated baseband signals to have at least some separation, successive cancellation can be used to further improve reception and reproduction of the communications. In addition, the step of modulating the estimate of the first information sequence is preceded by decoding the estimate of the first information sequence to improve the estimate of the first information sequence, and re-encoding the improved estimate of the first information sequence so that the improved and re-encoded estimate of the first information sequence is modulated during the modulating step. The decoding step thus provides a higher degree of signal separation before successive cancellation. The step of subtracting the modulated estimate can also include extrapolating the modulated estimate of the first information sequence to estimate a component of the second separated baseband signal attributable to the first information signal.

More particularly, the step of receiving the plurality of information signals can include receiving first and second co-channel signals from respective first and second antennas. The step of generating the first and second separated baseband signals can thus include combining the first and second co-channel signals according to a first combining branch to generate the first separated baseband signal corresponding to the first information signal, and combining the first and second co-channel signals according to a second combining branch to generate the second separated baseband signal corresponding to the second information signal.

Alternately, the step of receiving the plurality of information signals can include receiving a co-channel signal. In addition, the step of generating the first and second separated baseband signals can include filtering the co-channel signal using a first filter to generate the first separated baseband signal corresponding to the first information signal, and filtering the co-channel signal using a second filter different from the first filter to generate the second separated baseband signal corresponding to the second information signal. More particularly, the first filter can include a first medium response estimate for the first information signal and the second filter can include a second medium response estimate for the second information signal.

According to yet another alternative, the step of receiving the plurality of information signals can include receiving a co-channel signal. In this alternative, the step of generating the first and second separated baseband signals includes sampling the co-channel signal with a first sampling phase to generate a first sampled co-channel signal, sampling the co-channel signal with a second sampling phase different than the first sampling phase to generate a second sampled co-channel signal, combining the first and second sampled co-channel signals using a first filter combination to provide the first separated baseband signal, and combining the first and second sampled co-channel signals using a second filter combination to provide the second separated baseband signal.

According to still another alternative, the step of receiving the plurality of information signals can include receiving a co-channel signal. Here, the step of generating the first and second separated baseband signals includes sampling the co-channel signal with a first sampling phase to generate the first separated baseband signal, and sampling the co-channel signal with a second sampling phase different than the first sampling phase to generate the second separated baseband signal. The method can also include modulating the estimate of the second information sequence to provide a modulated estimate of the second information sequence, subtracting the modulated estimate of the second communication from the first separated baseband signal to provide an improved first separated baseband signal, and demodulating the improved first separated baseband signal to provide an improved estimate of the first information sequence. Additional levels of successive cancellation can thus be provided.

According to another aspect of the present invention, a plurality of communications can be received from a respective plurality of transmitters using a common carrier frequency by receiving a plurality of information signals on a common carrier frequency corresponding to the plurality of communications from the plurality of transmitters, and generating a co-channel baseband signal responsive to the plurality of information signals. The co-channel baseband signal is demodulated to provide an estimate of a first information sequence corresponding to a first one of the communications, the estimate of the first information sequence is decoded to improve the estimate of the first information sequence, and the improved estimate of the first information sequence is re-encoded. The improved and re-encoded estimate of the first information sequence is modulated and subtracted from the co-channel baseband signal to provide a second baseband signal, and the second baseband signal is demodulated to provide an estimate of a second information sequence corresponding to a second one of the communications. Decoding and re-encoding can thus provide signal separation for two information signals transmitted on a common carrier frequency.

Methods and receivers according to the present invention thus allow improved reception of multiple information signals transmitted without channel separation over a common carrier frequency.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Improved reception of a plurality of communications transmitted by a respective plurality of transmitters as information signals over a common carrier frequency can be provided according to the present invention by separating signals to provide a plurality of baseband signals corresponding to the plurality of information signals being received. In particular, a separated baseband signal can be provided for each information signal being received, and successive cancellation can be used to improve the reception of the information signal over the common carrier frequency using the separated baseband signals.

Figure 1:
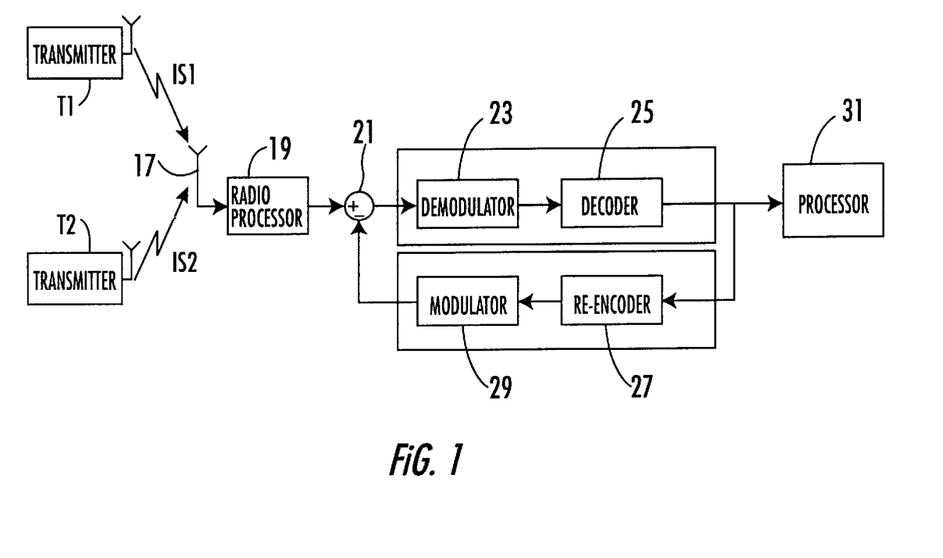
FIG. 1 is a block diagram of a first receiver providing signal separation and successive cancellation according to the present invention.

FIG. 1 is a block diagram of a receiver providing signal separation and successive cancellation according to a first aspect of the present invention. As shown, the receiver includes a radio processor 19, a subtractor 21, a demodulator 23, a decoder 25, a re-encoder 27, a modulator 29, and a processor 31. In the receiver of FIG. 1, a first information signal is received over a common carrier frequency by demodulating a common co-channel baseband signal from the radio processor 19 and decoding the result to generate an estimate of a first information sequence corresponding to the first stronger information signal. The estimate of the first information sequence is then re-encoded, modulated, and subtracted from the common co-channel baseband signal to provide a second baseband signal. This second baseband signal is then demodulated and decoded to provide an estimate of a second information sequence corresponding to a second information signal received over the common carrier frequency. While performance can be improved when the first information signal is stronger than the second information signal, receivers and methods according to the diagram of FIG. 1 can be used to receive first and second information signals having relatively equal strengths.

In other words, the channel coding/decoding power used in wireless mobile radio systems can be used to obtain signal separation for multiple information signals transmitted without channel separation over a common carrier frequency. After generating an estimate a first information sequence corresponding to a first information signal, the re-encoded and modulated first information sequence is subtracted from the common baseband signal to allow an estimation of a second information sequence corresponding to a second information signal. In particular, by decoding the estimate of the first information sequence, the estimate of the first information sequence is improved so that after re-encoding and modulating, the improved estimate of the first information sequence can be subtracted from the common baseband signal to effectively provide a second separated baseband signal used to obtain the second information sequence. The successive cancellation is thus employed after decoding.

In greater detail, a plurality of information signals IS1 and IS2 from a corresponding plurality of remote transmitters T1 and T2 can be received on a common carrier frequency at the antenna 17 wherein each information signal represents a respective communication transmitted by a respective transmitter. The radio processor 19 provides a common co-channel baseband signal including components corresponding to each of the plurality of information signals. While any number of information signals representing respective communications can be transmitted on the common carrier frequency, two information signals will be discussed with respect to the receiver of FIG. 1.

The strongest of the information signals IS1 (if the signal strengths are different) received on the common carrier frequency can be determined based on the signal strength which can be obtained from the channel estimates, and this strongest information signal can be demodulated using the demodulator 23 and decoded using the decoder 25 to provide an estimate of a corresponding first information sequence transmitted from the remote transmitter T1. This combination of demodulation and decoding thus provides a separation of the first information sequence corresponding to the first information signal IS1 with respect to the plurality of information sequences and corresponding communications.

The estimate of the first information sequence is then re-encoded using re-encoder 27 and modulated using modulator 29 to reconstruct a relatively clean version of the portion of the common co-channel baseband signal corresponding to the strongest information signal IS1. The portion of the common co-channel baseband signal corresponding to the strongest information signal IS1 is then subtracted from the total common co-channel baseband signal using the subtractor 21 so that the remaining portion of the baseband signal corresponds to a second weaker information signal IS2. The remaining portion of the baseband signal is then demodulated using the demodulator 23 and decoded using the decoder 25 to provide an estimate of a second information sequence corresponding to the second weaker information signal IS2 from the second remote transmitter T2.

The estimate of the first and second information sequences can then be processed using processor 31 to reproduce the corresponding first and second communications. In a radiotelephone base station, for example, first and second communications can be reproduced to provide voice communications. Alternately, the first and second communications can be reproduced to provide data communications. In addition, the process can be repeated in additional stages for further improvements of the reproduced communications. The estimate of the second information sequence, for example, can be re-encoded, modulated, and subtracted from the common co-channel baseband signal to further improve the estimate of the first information sequence. This improved estimation of the first information sequence can then be used to further improve the estimate of the second information sequence, with any number of subsequent stages of successive cancellation being used. In addition, the estimates of the first and second information sequences can both be re-encoded, modulated, and subtracted from the common co-channel baseband signal to obtain a third information sequence corresponding to a third information signal transmitted over the common carrier frequency from a third transmitter.

Furthermore, the decoder 25 can perform a cyclical redundancy check (CRC) on the estimate of the first information sequence. If the estimate of the first information sequence passes the cyclical redundancy check, the estimate of the first information sequence can be re-encoded, modulated and subtracted from the common co-channel baseband signal to obtain an estimate of the second information sequence. If the cyclical redundancy check fails, the estimate of the first information sequence may not be sufficiently accurate to reliably obtain an estimate of the second information sequence so that successive cancellation is not performed when the cyclical redundancy check fails. Similarly, a bit error rate (BER) may be determined for the first information sequence so that successive cancellation is not performed if the bit error rate is greater than a predetermined value.

In summary, multiple information signals IS1 and IS2 can be received at the antenna 17 over a common carrier frequency wherein the information signals are transmitted without channel separation. It will be understood that multiple antennas can also be used. Responsive to the multiple information signals, the radio processor 19 generates the common co-channel baseband signal including portions thereof corresponding to both the multiple information signals received at the antenna. In greater detail, the radio processor 19 can amplify, mix, filter, sample, and quantize all signals received on the common carrier frequency to extract the common co-channel baseband signal including portions corresponding to both information signals IS1 and IS2. The common co-channel baseband signal can be used to estimate channel parameters from both information signals IS1 and IS2 using a channel estimation algorithm such as joint channel estimation or other conventional channel estimation algorithms. The channel estimates can then be used to determine the strongest information signal received at the antenna 17.

The common co-channel baseband signal is then demodulated using demodulator 23 and decoded using decoder 25 to provide an estimate of a first information sequence corresponding to the strongest information signal. The estimate of the first information sequence can then be processed using the processor 31 to reproduce the communication from the first transmitter T1 transmitted as the first information signal IS1. Alternately, the estimate of the first information sequence can be further improved using successive cancellation before reproducing the corresponding communication.

The estimate of the first information sequence is then re-encoded using re-encoder 27, modulated using modulator 29, and subtracted from the common co-channel baseband signal using subtractor 21. In other words, baseband samples corresponding to the strongest information signal IS1 are subtracted from the common co-channel baseband signal to provide a second baseband signal with a primary component corresponding to the second weaker information signal IS2. This second baseband signal is then demodulated using the demodulator 23 and decoded using the decoder 25 to provide an estimate of a second information sequence corresponding to the second information signal IS2. The estimate of the second information sequence can then be processed using processor 31 to reproduce the communication from the second transmitter T2 transmitted as the second information signal IS2.

In addition, the estimate of the second information sequence can be re-encoded using re-encoder 27, modulated using modulator 29, and subtracted from the common co-channel baseband signal using subtractor 21. Baseband samples corresponding to the weaker information signal IS2 are thus subtracted from the common co-channel baseband signal to provide a third baseband signal more closely matching the first information signal. This third baseband signal can then be demodulated and decoded to provide an improved estimate of the first information sequence corresponding to the first information signal IS1. This improved estimate of the first information sequence can then be processed to reproduce the communication from the first transmitter. This improved estimate of the first information sequence can also be used in a subsequent phase of successive cancellation to further improve the estimate of the second information sequence.

Figure 2:
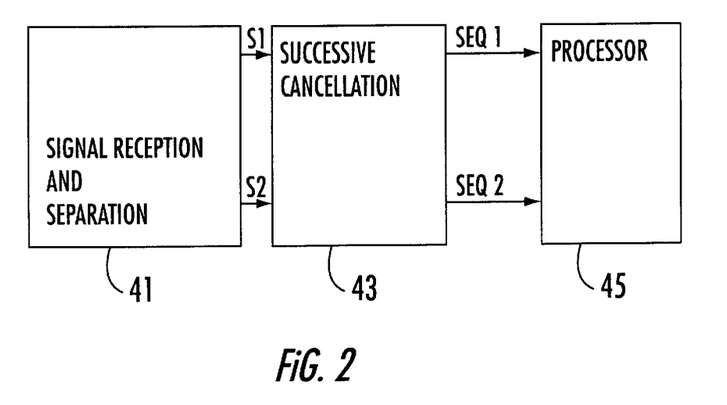
FIG. 2 is a block diagram of a second receiver providing signal separation and successive cancellation according to the present invention.

FIG. 2 illustrates a block diagram of a second receiver according to the present invention using spatial and/or temporal processing of co-channel signals to provide separated baseband signals for different information signals received over a common carrier frequency wherein the information signals are transmitted without channel separation. In particular, the signal reception and separation block 41 can be used to receive a plurality of information signals over a common carrier frequency and to provide separated baseband signals S1 and S2 corresponding to respective information signals received from remote transmitters. In particular, the first separated baseband signal can include a primary component corresponding to a first information signal and the second separated baseband signal can include a primary component corresponding to a second information signal. The successive cancellation block 43 is then used to further improve the signal separation thus providing information sequences Seq1 and Seq2. The information sequences Seq1 and Seq2 can then be processed using processor 45 to reproduce communications from respective transmitters.

Figure 3A:
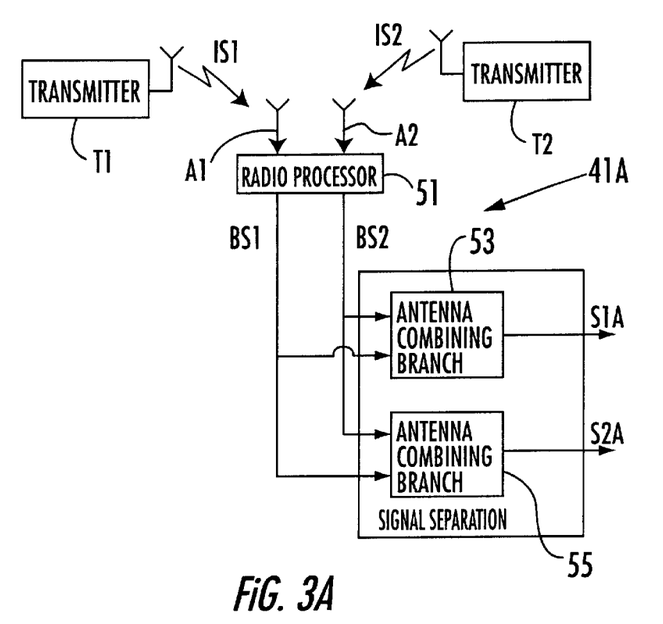
FIGS. 3A–3D are block diagrams illustrating respective signal reception and separation blocks according to the receiver of FIG. 2.

Various structures for providing signal reception and separation for the receiver of FIG. 2 are illustrated in FIGS. 3A–3D. In particular, FIG. 3A illustrates signal reception and separation using antenna combining. As shown, multiple antennas A1 and A2 each receive the information signals IS1 and IS2 from respective transmitters T1 and T2 over a common carrier frequency. The radio processor 51 amplifies, mixes, filters, samples, and quantizes the signals from the antennas to provide common co-channel baseband signals BS1 and BS2 corresponding to the respective antennas A1 and A2. Two antenna combining branches 53 and 55 respectively corresponding to the information signals IS1 and IS2 combine the common co-channel baseband signals BS1 and BS2 from the different antennas to respectively increase the effect of one information signal and decrease the effect of the other information signal using spatial processing techniques.

In particular, the antenna combining branch 53 combines the common co-channel baseband signals BS1 and BS2 so as to increase the effect of information signal IS1 and decrease the effect of the effect of information signal IS2 in the resulting baseband signal S1A. Similarly, the antenna combining branch 55 combines the common co-channel baseband signals BS1 and BS2 so as to increase the effect of information signal IS2 and decrease the effect of the effect of information signal IS1 in the resulting baseband signal S2A. Accordingly, even if the strengths of the information signals IS1 and IS2 are on the same order, antenna combining can be used to provide some separation of the different information signals in the baseband signals S1A and S2A when the information signals are transmitted without channel separation. In other words, the separated baseband signal S1A includes a primary component corresponding to the information signal IS1, and the separated baseband signal S2A includes a primary component corresponding to the information signal IS2.

In particular, antenna combining techniques such as maximal ratio combining (MRC) or interference.cancellation combining can be used in the antenna combining branches 53 and 55. Various combining techniques are also discussed in the reference by Jack H. Winters entitled "Optimum Combining for Indoor Radio Systems with Multiple Users" (*IEEE Trans. Commun.*, pp. 1222–1230, Nov. 1987) and the reference by H. Yoshino et al. entitled "Interference Cancelling Characteristics of DFE Transversal—Combining Diversity in Mobile Radio Environment—Comparison with Metric-Combining Schemes" (*Electronics and Commun. in Japan*, pp. 85–98, Part 1, vol. 77, No. 9, 1994). The disclosures of both of these references are hereby incorporated herein in their entirety by reference.

The separated baseband signals S1A and S2A are then subjected to successive cancellation as discussed above with regard to the successive cancellation block 43. In general, the separated baseband signal corresponding to the strongest information signal is demodulated, remodulated, and then extrapolated before being subtracted from the separated baseband signal corresponding to the weaker information signal. Successive cancellation will be discussed in greater detail below with regard to FIGS. 4A to 4D.

The separated baseband signals S1A and S2A can thus be provided so that information signal IS1 is emphasized in separated baseband signal S1A and so that the information signal IS2 is emphasized in the separated baseband signal S2A. Successive cancellation can then be employed using the separated baseband signals. While only two antennas and two information signals are illustrated in FIG. 3A, it will be understood that any number of antenna signals and any number of antenna combining branches can be provided according to the present invention. Moreover, the separation techniques discussed above with regard to FIG. 3A can be used with more than two co-channel information signals.

Figure 3B:
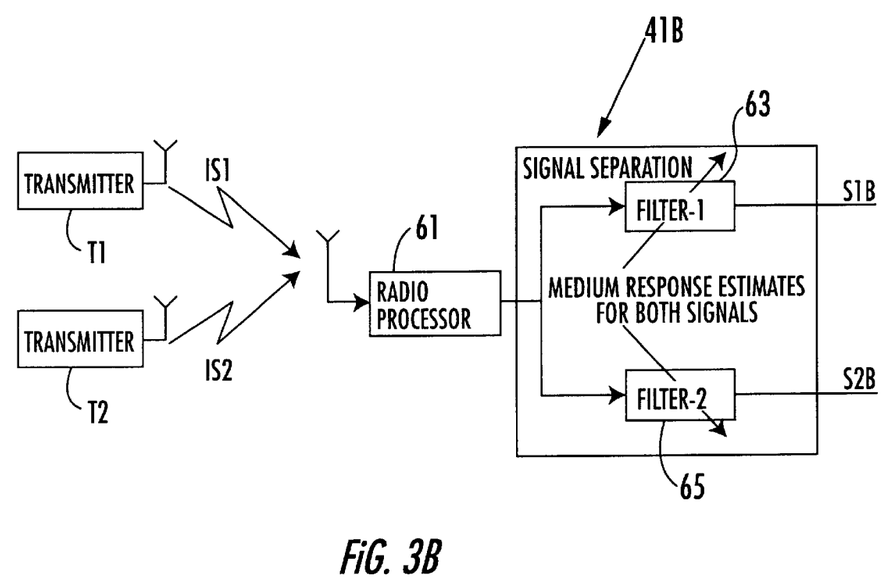

FIG. 3B illustrates signal reception and separation using using the frequency selectiveness of a fading channel which could be particularly useful in systems with severely frequency selective channels such as GSM. In other words, temporal processing is used to provide signal separation. As shown, intentional or non-intentional frequency selectivity allows separation of co-channel signals after implementing receive filtering in the radio processor 61 using second stage medium filters 63 and 65 which can be matched filters. Alternately, the filters 63 and 65 can be designed so that interference on each branch is reduced. In other words, the filters 63 and 65 do not have to be matched, but could instead be interference rejection filters based on the channel tap estimates of the desired and co-channel medium responses. Conventional time and space filtering is discussed, for example, in the reference by William A. Gardner entitled "Cyclic Wiener Filtering: Theory and Method." (IEEE Transactions on Communications, Vol. 41, No. 1, January 1993.)

As shown in FIG. 3B, the information signals IS1 and IS2 are transmitted by the remote transmitters T1 and T2 over a common carrier frequency at the antenna. The co-channel signals are processed by the radio processor 61 which amplifies, mixes, filters, samples, and quantizes the signal to extract a common co-channel baseband signal including components of both information signals IS1 and IS2. The common co-channel baseband signal is filtered using the filter 63 based on a medium response estimate of the first information signal and using the filter 65 based on a medium response estimate of the second information signal. In other words, signal separation is dependent on time alignment of each information signal. Accordingly, the medium responses and the time alignments of each signal are estimated.

For example, the medium response estimates for the first information signal IS1 can be used for the first filter 63, and the medium response estimate for the second information signal IS2 can be used for the second filter 65. The medium responses corresponding to different signals can be estimated using joint channel estimation before these filters. The separated baseband signals S1B and S2B are thus provided, and successive cancellation can be used as discussed in greater detail below.

Figure 3C:
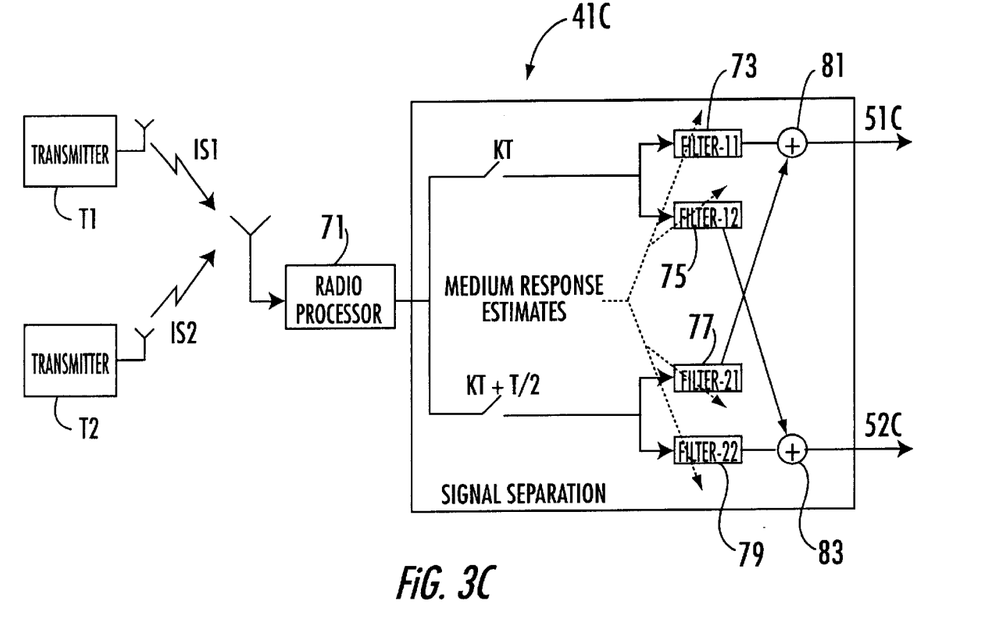

FIG. 3C illustrates signal reception and separation using spectral redundancy to provide signal separation. In particular, signals from different fractional samples (with filters to reduce the sum of filtered error signals) can be used to suppress interference and to provide signal separation. In general, signal separation, prior to successive cancellation is not expected to eliminate interference components of the separated baseband signals S1C and S2C, and spectral redundancy can be used to provide a degree of signal separation when the strengths of the received information signals are on the same order. Successive cancellation can then be applied to the separated baseband signals to further reduce interference components of the two branches. Filtering is discussed in the Gardner reference (cited above), the disclosure of which is hereby incorporated herein in its entirety by reference.

As shown in FIG. 3C, co-channel signals including information signals IS1 and IS2 are received at the antenna and processed in the radio processor 71 which amplifies, mixes, filters, samples, and quantizes the co-channel signals to provide a common co-channel baseband signal. The common co-channel baseband signal is sampled using different sampling phases (kT and kT+T/2); filtered using filters 73, 75, 77, and 79; and combined using combiners 81 and 83 to provide the separated baseband signals S1C and S2C corresponding to the information signals IS1 and IS2. Successive cancellation can then be used as discussed in greater detail below. Although only two sampling phases are discussed here, receivers and methods according to FIG. 3C can be provided according to the present invention with more than two sampling phases.

The signal reception and separation approaches discussed above with regard to FIGS. 3A–3C assume that the information signals IS1 and IS2 are both symbol and slot synchronized. If the co-channel signals, however, are not slot and symbol synchronized, signal separation can be obtained using multiple sampling phases which are preferential for each of the co-channel signals. Using knowledge of pulse shapes and medium taps, the first information signal can be re-constructed at the sampling phase of the second information signal and subtracted from the second information signal. The timing difference can thus be exploited for the separation of co-channel signals. This approach can be extended to dispersive cases which require the timing of the different taps for both co-channel signals.

Figure 3D:
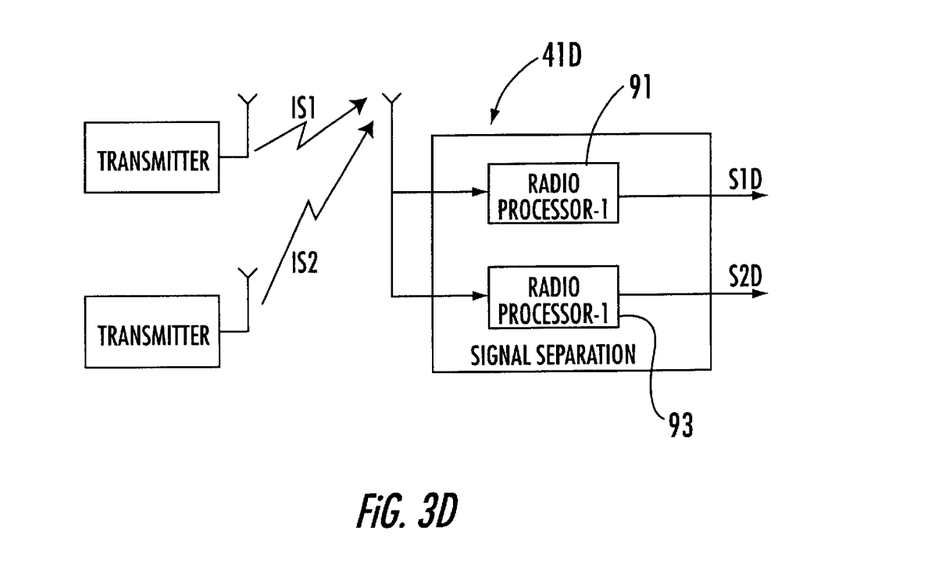

As shown in FIG. 3D, two different radio processors 91 and 93 are used to process the co-channel information signals IS1 and IS2. The first radio processor 91 amplifies, mixes, filters, samples, and quantizes the co-channel signal with a sampling phase that is preferential with respect to the first co-channel signal. Similarly, the second radio processor 93 amplifies, mixes, filters, samples, and quantizes the co-channel signal with a sampling phase that is preferential with respect to the second co-channel signal. The separated baseband signals S1D and S2D are further processed using the successive cancellation techniques discussed below. Methods for reducing co-channel interference are discussed, for example, in U.S. patent application Ser. No. 09/143,821 entitled "Methods and Systems for Reducing Co-Channel Interference Using Multiple Timings for Received Signal" filed Aug. 31, 1998. The disclosure of this application is hereby incorporated herein in its entirety by reference. It is further noted that application Ser. No. 09/143,821 is assigned to the assignee of the present invention, and that application Ser. No. 09/143,821 and the present invention share a common inventor.

Figure 4A:
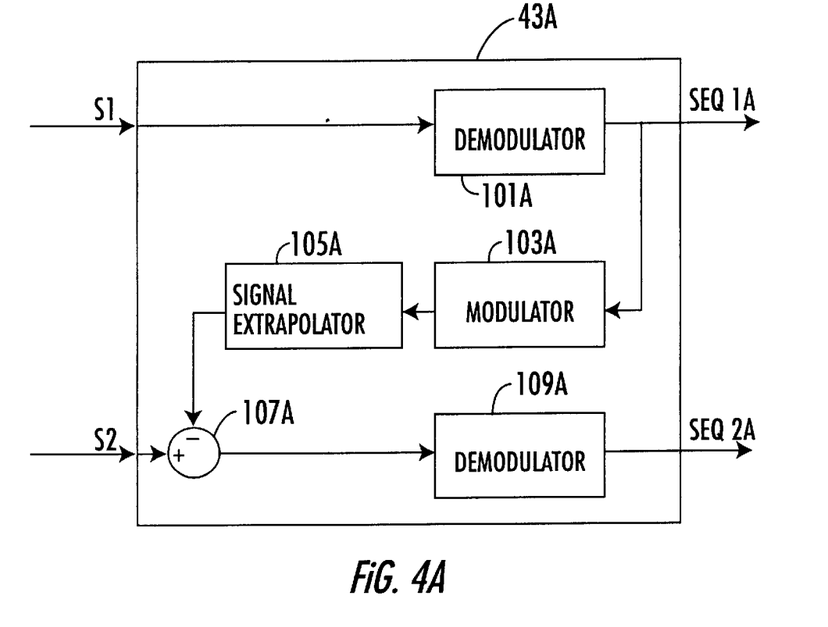
FIGS. 4A–4D are block diagrams illustrating respective successive cancellation blocks according to the receiver of FIG. 2.

Various successive cancellation blocks according to FIG. 2 are illustrated in FIGS. 4A to 4D. In particular, FIG. 4A illustrates a successive cancellation block including a first demodulator 101A, a modulator 103A, a signal extrapolator 105A, subtractor 107A, and a second demodulator 109A. Two separated baseband signals S1 and S2 are provided from the signal reception and separation block 41, as shown in FIG. 2. The separated baseband signals can be provided according to any of the reception and separation techniques discussed above with regard to FIGS. 3A–3D or other reception and separation techniques.

The separated baseband signal S1 corresponding to the stronger information signal IS1 received over the common carrier frequency can be demodulated using demodulator 101A to provide an estimate of the information sequence Seq1A corresponding to the information sequence IS1. As discussed above, the strongest information signal can be determined using 30 channel estimates. The channel estimates can be recalculated in each branch or extracted using information from prior blocks if the channel estimates have been previously estimated. Alternately, the information signals can have approximately equal strengths or the separated baseband signal corresponding to the weaker information signal can be processed first.

The estimate of the information sequence Seq1A is then modulated using modulator 103A to reconstruct the separated baseband signal S1, and the reconstructed baseband signal is extrapolated using signal extrapolator 105A to estimate the effect of the first information signal on the second separated baseband signal S2. The extrapolated signal is then subtracted from the second separated baseband signal S2 to provide more accurate demodulation of the second information signal thus providing a more accurate estimate of the second information sequence Seq2B. The two information sequences Seq1A and Seq1B can then be processed using processor 45 to reproduce communications corresponding to information signals IS1 and IS2 corresponding to transmitters T1 and T2. The processor 45, for example, can decode each of the information sequences to further improve the estimates thereof.

Figure 4B:
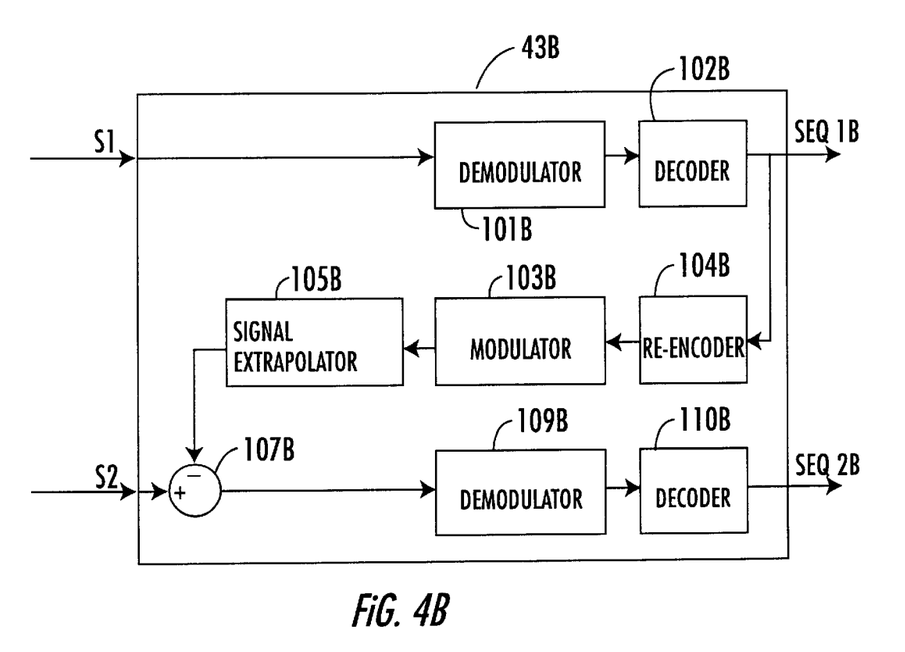

FIG. 4B illustrates a successive cancellation block including a first demodulator 101B, a modulator 103B, a signal extrapolator 105B, subtractor 107B, and a second demodulator 109B. In addition, the successive cancellation block of FIG. 4B includes first and second decoders 102B and 110B and encoder 104B. The successive cancellation block of FIG. 4B is similar to that of FIG. 4A with the exception that the estimate of the first information sequence is decoded using decoder 102B and re-encoded using re-encoder 104B before modulating and extrapolating the estimate of the first information sequence using modulator 103B and signal extrapolator 105B. The estimate of the first information sequence can thus be improved after demodulation and before subtraction to provide a more accurate baseband signal representation of the second information signal. The decoder 110B provides that both estimates of the information sequences are decoded before the processor 45. Accordingly, the processor does not need to perform decoding functions.

Figure 4C:
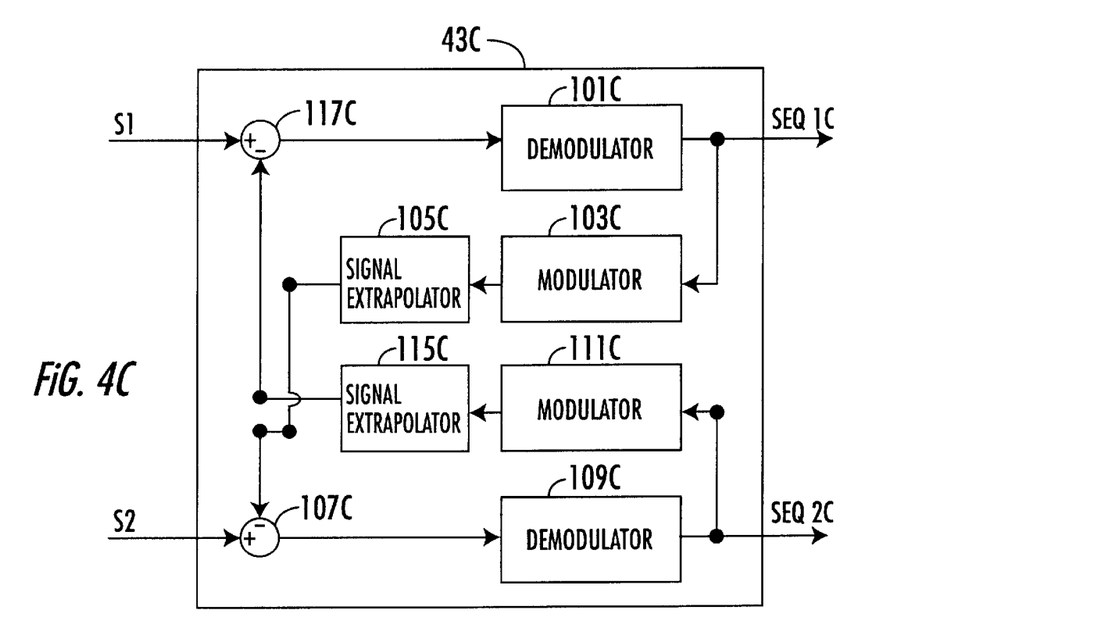
Figure 4D:
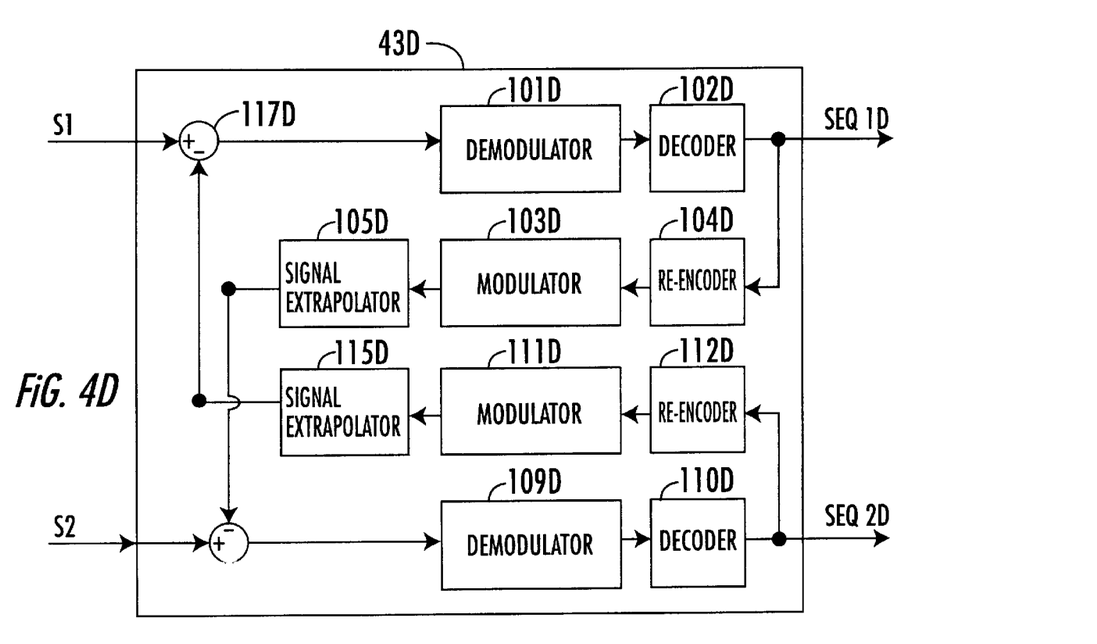

FIGS. 4C and 4D illustrate successive cancellation blocks respectively corresponding to the blocks of FIGS. 4A and 4B. The successive cancellation block of FIG. 4C, for example, includes a first demodulator 101C, a modulator 103C, a signal extrapolator 105C, subtractor 107C, and a second demodulator 109C that operate as discussed above with regard to FIG. 4A to subtract a modulated and extrapolated estimate of the first information sequence Seq1C from the second separated baseband signal S2 before modulating the second separated baseband signal. In addition, the estimate of the second information sequence Seq2C is then modulated using modulator 111C, extrapolated using signal extrapolator 115C, and subtracted from the first separated baseband signal S1 so that the estimate of the information sequence Seq1C can be further improved. By subtracting the modulated and extrapolated estimate of the second information sequence from the first separated baseband signal S1, the effects of the second information signal can be reduced in the determination of a second and improved estimate of the first information sequence Seq1D. Additional stages of successive cancellation can be provided, for example, by modulating, extrapolating, and subtracting the second estimate of the first information sequence from the second separated baseband signal to provide a second and improved estimate of the second information sequence. Any number of improved estimates of the first and second information sequences can thus be provided by providing additional stages of successive cancellation.

The successive cancellation block of FIG. 4D is similar to that of FIG. 4C with the addition of decoders 102D and 110D and re-encoders 104D and 112D. As discussed above with regard to FIG. 4B, the decoders and re-encoders further improve the estimates of the information sequences before subtraction from separated baseband signals. In other words, the use of the decoders in the successive cancellation loop can provide a higher degree of signal separation and can thus allow the generation of more accurate estimates of the information sequences.

As discussed above with regard to FIG. 1, any stage of successive cancellation can be proceeded by determining a level of accuracy of the estimate of the information sequence. For example, a cyclical redundancy check (CRC) can be performed or a bit error rate (BER) can be determined for the estimate of the information sequence. If the estimate of the information sequence has a desired level of accuracy (i.e., the cyclical redundancy check passes, or a desired bit error rate is achieved), the successive cancellation may proceed. If the estimate of the information sequence does not have the desired level of accuracy, the estimate of the information sequence may not be sufficiently reliable to justify successive cancellation. Accordingly, a subsequent stage of successive cancellation may not be performed. In FIGS. 4A and 4C, for example, the accuracy of each information sequence can be determined at a respective demodulator. In FIGS. 4B and 4D, for example, the accuracy of each information sequence can be determined at a respective demodulator and/or decoder.

Although the signals are demodulated and subtracted successively in the embodiments discussed above, signal separation according to the present invention can also be applied to parallel cancellation of co-channel signals, where the signals are demodulated, decoded, re-encoded, remodulated and subtracted from each other in parallel (at the same time).

In the drawings and specification, there have been disclosed typical preferred embodiments of the invention and, although specific terms are employed, they are used in a generic and descriptive sense only and not for purposes of limitation, the scope of the invention being set forth in the following claims. While various signal separation and successive cancellation techniques have been discussed above, those having skill in the art will understand that the present invention can be implemented with other signal separation and/or successive cancellation techniques.

That which is claimed is:

1. A method for receiving a plurality of communications from a respective plurality of transmitters and antennas using a common carrier frequency wherein the plurality of communications are transmitted without channel separation spreading codes, the method comprising the steps of:

receiving a plurality of information signals on a common carrier frequency corresponding to the plurality of communications transmitted without channel separation spreading codes from the plurality of transmitters and antennas;

generating first and second separated signals corresponding to respective first and second ones of the information signals without channel separation spreading codes so that the first separated signal includes a primary component baseband signal includes a primary component corresponding to the second information signal;

demodulating the first separated signal to provide an estimate of a first information sequence corresponding to the first information signal;

modulating the estimate of the first information sequence to provide a modulated estimate of the first information sequence;

subtracting the modulated estimate of the first information sequence from the second separated signal to provide an improved second separated baseband signal; and demodulating the improved second separated signal to provide an estimate of a second information sequence corresponding to the second information signal.

2. A method according to claim 1 further comprising the step of:

processing the estimates of the first and second information sequences to reproduce the first and second communications.

3. A method according to claim 1 wherein the step of modulating the estimate of the first information sequence is preceded by the steps of:

decoding the estimate of the first information sequence to improve the estimate of the first information sequence; and after the step of decoding, re-encoding the improved estimate of the first information sequence so that the improved and re-encoded estimate of the first information sequence is modulated during the modulating step.

4. A method according to claim 1 wherein the step of subtracting the modulated estimate comprises extrapolating the modulated estimate of the first information sequence to estimate a component of the second separated signal attributable to the first information signal.

5. A method according to claim 1:
wherein the step of receiving the plurality of information signals comprises receiving first and second co-channel signals from respective first and second antennas; and
wherein the step of generating the first and second separated signals comprises the steps of,
combining the first and second co-channel signals according to a first combining branch to generate the first separated signal corresponding to the first information signal, and
combining the first and second co-channel signals according to a second combining branch to generate the second separated signal corresponding to the second information signal.

6. A method according to claim 1:
wherein the step of receiving the plurality of information signals comprises receiving a co-channel signal; and
wherein the step of generating the first and second separated signals comprises the steps of,
filtering the co-channel signal using a first filter to generate the first separated signal corresponding to the first information signal, and
filtering the co-channel signal using a second filter different from the first filter to generate the second separated signal corresponding to the second information signal.

7. A method according to claim 6 wherein the first filter comprises a first medium response estimate including time estimation for the first information signal and the second filter comprises a second medium response estimate including timing estimation for the second information signal.

8. A method according to claim 1:
wherein the step of receiving the plurality of information signals comprises receiving a co-channel signal; and
wherein the step of generating the first and second separated signals comprises the steps of,
sampling the co-channel signal at a first sampling phase to generate a first sampled co-channel signal,
sampling the co-channel signal with a second sampling phase different than the first sampling phase to generate a second sampled co-channel signal,
combining the first and second sampled co-channel signals using a first filter combination to provide the first separated signal, and
combining the first and second sampled co-channel signals using a second filter combination to provide the second separated signal.

9. A method according to claim 1:
wherein the step of receiving the plurality of information signals comprises receiving a co-channel signal; and
wherein the step of generating the first and second separated signals comprises the steps of,
sampling the co-channel signal with a first sampling phase to generate the first separated signal, and
sampling the co-channel signal with a second sampling phase different than the first sampling phase to generate the second separated signal.

10. A method according to claim 1 further comprising the steps of:
modulating the estimate of the second information sequence to provide a modulated estimate of the second information sequence;
subtracting the modulated estimate of the second communication from the first separated signal to provide an improved first separated signal; and
demodulating the improved first separated signal to provide an improved estimate of the first information sequence.

11. A method according to claim 1 wherein the first and second separate signals comprise first and second separated baseband signals.

12. A method according to claim 1 wherein modulating the estimate of the first information sequence is preceded by:
checking the first information sequence for a predetermined level of accuracy wherein the modulated estimate of the first information sequence is not subtracted if the first information sequence does not meet the predetermined level of accuracy.

13. A method for receiving a plurality of communications from a respective plurality of transmitters and antennas using a common carrier frequency wherein the plurality of communications are transmitted without channel separation spreading codes, the method comprising the steps of:
receiving a plurality of information signals on a common carrier frequency corresponding to the plurality of communications transmitted without channel separation spreading codes from the plurality of transmitters and antennas;
generating a co-channel signal responsive to the plurality of information signals without channel separation spreading codes;
demodulating the co-channel signal to provide an estimate of a first information sequence corresponding to a first one of the communications;
decoding the estimate of the first information sequence to improve the estimate of the first information sequence;
re-encoding the improved estimate of the first information sequence;
modulating the improved and re-encoded estimate of the first information sequence;
subtracting the modulated estimate of the first information sequence from the co-channel signal to provide a second signal; and
demodulating the second signal to provide an estimate of a second information sequence corresponding to a second one of the communications.

14. A method according to claim 13 further comprising the step of:
processing the estimates of the first and second information sequences to reproduce the first and second communications.

15. A method according to claim 13 further comprising the step of:
decoding the estimate of the second information sequence to improve the estimate of the second information sequence.

16. A method according to claim 15 further comprising the steps of:
re-encoding the improved estimate of the second information sequence;
modulating the improved and re-encoded estimate of the second information sequence;
subtracting the modulated estimate of the second information sequence from the co-channel baseband signal to provide a third baseband signal; and
demodulating the third baseband signal to provide a second estimate of the first communication.

17. A method according to claim 14 further comprising the step of:

decoding the second estimate of the first information sequence.

18. A method according to claim 13 wherein the co-channel signal comprises a co-channel baseband signal and wherein the second channel comprises a second baseband signal.

19. A method according to claim 13 wherein modulating the improved and re-encoded estimate of the first information sequence is preceded by:
checking the improved estimate of the first information sequence for a predetermined level of accuracy wherein the modulated estimate of the first information sequence is not subtracted from the co-channel signal if the first information sequences does not meet the predetermined level of accuracy.

20. A method for receiving a plurality of communications from a respective plurality of transmitters and antennas using a common carrier frequency wherein the plurality of communications are transmitted without channel separation spreading codes, the method comprising the steps of:
receiving a plurality of information signals on the common carrier frequency corresponding to the plurality of communications transmitted without channel separation spreading codes from the plurality of transmitters and antennas;
generating a first signal responsive to the plurality of information signals without channel separation spreading codes;
generating an estimate of a first information sequence corresponding to a first one of the communications responsive to the first signal;
modulating the estimate of the first information sequence;
subtracting the modulated estimate of the first information sequence from a second signal to provide a third signal; and
demodulating the third signal to provide an estimate of a second information sequence corresponding to a second one of the communications.

21. A method according to claim 20 further comprising the step of:
processing the estimates of the first and second information sequences to reproduce the first and second communications.

22. A method according to claim 20 wherein the first and second signals comprise a common signal.

23. A method according to claim 20 wherein the first signal includes a primary component corresponding the first information sequence, and wherein the second signal includes a primary component corresponding to the second information sequence.

24. A method according to claim 16 wherein the first, second, and third signals comprise first, second, and third baseband signals.

25. A communications device that receives a plurality of communications from a respective plurality of transmitters and antennas using a common carrier frequency wherein the plurality of communications are transmitted without channel separation spreading codes, the communications device comprising:
a receiver that receives a plurality of information signals on a common carrier frequency corresponding to the plurality of communications transmitted without channel separation spreading codes from the plurality of transmitters and antennas;
a signal separator that generates first and second separated signals corresponding to respective first and second ones of the information signals without channel separation spreading codes so that the first separated signal includes a primary component corresponding to the first information signal and so that the second separated signal includes a primary component corresponding to the second information signal;
a first demodulator that demodulates the first separated signal to provide an estimate of a first information sequence corresponding to the first information signal;
a modulator that modulates the estimate of the first information sequence to provide a modulated estimate of the first information sequence;
a subtractor that subtracts the modulated estimate of the first information sequence from the second separated signal to provide an improved second separated signal; and
a second demodulator that demodulates the improved second separated signal to provide an estimate of a second information sequence corresponding to the second information signal.

26. A communications device according to claim 25 further comprising:
a processor that processes the estimates of the first and second information sequences to reproduce the first and second communications.

27. A communications device according to claim 25 further comprising:
a decoder that decodes the estimate of the first information sequence to improve the estimate of the first information sequence; and
a re-encoder that re-encodes the improved estimate of the first information sequence so that the improved and re-encoded estimate of the first information sequence is modulated by the modulator.

28. A communications device according to claim 25 further comprising:
a signal extrapolator that extrapolates the modulated estimate of the first information sequence to estimate a component of the second separated signal attributable to the first information signal so that the subtractor subtracts the modulated and extrapolated estimate of the first information sequence.

29. A communications device according to claim 25 wherein the first and second co-channel signals are received from respective first and second antennas, and wherein the signal separator combines the first and second co-channel signals according to a first combining branch to generate the first separated signal corresponding to the first information signal, and combines the first and second co-channel signals according to a second combining branch to generate the second separated signal corresponding to the second information signal.

30. A communications device according to claim 25 wherein the signal separator filters the co-channel signal using a first filter to generate the first separated signal corresponding to the first information signal, and filters the co-channel signal using a second filter different from the first filter to generate the second separated signal corresponding to the second information signal.

31. A communications device according to claim 30 wherein the first filter comprises a first medium response estimate including timing information for the first information signal and the second filter comprises a second medium response estimate including timing information for the second information signal.

32. A communications device according to claim 25 wherein the signal separator samples the co-channel signal with a first sampling phase to generate a first sampled co-channel signal, samples the co-channel signal with a second sampling phase different than the first sampling phase to generate a second sampled co-channel signal, combines the first and second sampled co-channel signals using a first filter combination to provide the first separated signal, and combines the first and second sampled co-channel signals using a second filter combination to provide the second separated signal.

33. A communications device according to claim 25 wherein the signal separator samples the co-channel signal with a first sampling phase to generate the first separated signal, and samples the co-channel signal with a second sampling phase different than the first sampling phase to generate the second separated signal.

34. A communications device according to claim 25 further comprising:
   a second modulator that modulates the estimate of the second information sequence to provide a modulated estimate of the second information sequence; and
   a second subtractor that subtracts the modulated estimate of the second communication from the first separated signal to provide an improved first separated signal;
   wherein the first demodulator demodulates the improved first separated signal to provide an improved estimate of the first information sequence.

35. A communications device according to claim 25 wherein the first and second separated signals comprise first and second separated baseband signals.

36. A communications device that receives a plurality of communications from a respective plurality of transmitters and antennas using a common carrier frequency wherein the plurality of communications are transmitted without channel separation spreading codes, the communications device comprising:
   a receiver that receives a plurality of information signals on a common carrier frequency corresponding to the plurality of communications transmitted without channel separation spreading codes from the plurality of transmitters and antennas;
   a co-channel signal generator that generates a co-channel signal responsive to the plurality of information signals without channel separation spreading codes;
   a demodulator that demodulates the co-channel signal to provide an estimate of a first information sequence corresponding to a first one of the communications;
   a decoder that decodes the estimate of the first information sequence to improve the estimate of the first information sequence;
   a re-encoder that re-encodes the improved estimate of the first information sequence;
   a modulator that modulates the improved and re-encoded estimate of the first information sequence; and
   a subtractor that subtracts the modulated estimate of the first information sequence from the co-channel signal to provide a second baseband signal wherein the demodulator demodulates the second signal to provide an estimate of a second information sequence corresponding to a second one of the communications.

37. A communications device according to claim 36 further comprising:
   a processor that processes the estimates of the first and second information sequences to reproduce the first and second communications.

38. A communications device according to claim 36 wherein the decoder decodes the estimate of the second information sequence to improve the estimate of the second information sequence.

39. A communications device according to claim 38 wherein the re-encoder re-encodes the improved estimate of the second information sequence, wherein the modulator modulates the improved and re-encoded estimate of the second information sequence, wherein the subtractor subtracts the modulated estimate of the second information sequence from the co-channel signal to provide a third signal, and wherein the demodulator demodulating the third signal to provide a second estimate of the first communication.

40. A communications device according to claim 39 wherein the decoder decodes the second estimate of the first information sequence.

41. A communications device according to claim 36 wherein the co-channel signal comprises a co-channel baseband signal and the second signal comprises a second baseband signal.

42. A method for receiving a plurality of communications from a respective plurality of transmitters and antennas using a common carrier frequency wherein the plurality of communications are transmitted without channel separation spreading codes, the method comprising the steps of:
   receiving a plurality of information signals on a common carrier frequency corresponding to the plurality of communications transmitted without channel separation spreading codes from the plurality of transmitters and antennas;
   generating first and second separated signals corresponding to respective first and second ones of the information signals without channel separation spreading codes so that the first separated signal includes a primary component corresponding to the first information signal and so that the second separated signal includes a primary component corresponding to the second information signal;
   extrapolating the first separated signal to estimate an effect of the first information signal on the second separated signal;
   subtracting the estimate of the effect of the first information signal from the second separated signal; and
   estimating first and second information sequences respectively corresponding to the first and second information signals.

43. A method according to claim 42 further comprising the step of:
   processing the estimates of the first and second information sequences to reproduce the first and second communications.

44. A method according to claim 42:
   wherein the step of receiving the plurality of information signals comprises receiving first and second co-channel signals from respective first and second antennas; and
   wherein the step of generating the first and second separated signals comprises the steps of,
      combining the first and second co-channel signals according to a first combining branch to generate the first separated signal corresponding to the first information signal, and
      combining the first and second co-channel signals according to a second combining branch to generate the second separated signal corresponding to the second information signal.

45. A method according to claim 42:
   wherein the step of receiving the plurality of information signals comprises receiving a co-channel signal; and wherein the step of generating the first and second separated signals comprises the steps of,
    filtering the co-channel signal using a first filter to generate the first separated signal corresponding to the first information signal, and
    filtering the co-channel signal using a second filter different from the first filter to generate the second separated signal corresponding to the second information signal.

46. A method according to claim 45 wherein the first filter comprises a first medium response estimate including timing information for the first information signal and the second filter comprises a second medium response estimate including timing information for the second information signal.

47. A method according to claim 42:
    wherein the step of receiving the plurality of information signals comprises receiving a co-channel signal; and
    wherein the step of generating the first and second separated signals comprises the steps of,
        sampling the co-channel signal with a first sampling phase to generate a first sampled co-channel signal,
        sampling the co-channel signal with a second sampling phase different than the first sampling phase to generate a second sampled co-channel signal,
        combining the first and second sampled co-channel signals using a first filter combination to provide the first separated signal, and
        combining the first and second sampled co-channel signals using a second filter combination to provide the second separated signal.

48. A method according to claim 42:
    wherein the step of receiving the plurality of information signals comprises receiving a co-channel signal; and
    wherein the step of generating the first and second separated signals comprises the steps of,
        sampling the co-channel signal with a first sampling phase to generate the first separated signal, and
        sampling the co-channel signal with a second sampling phase different than the first sampling phase to generate the second separated signal.

49. A method according to claim 42 further comprising the steps of:
    extrapolating the second separated signal to estimate an effect of the second information signal on the first separated signal; and
    subtracting the estimate of the effect of the second information signal from the first separated signal.

50. A method according to claim 42 wherein the first and second separated signals comprise first and second separated baseband signals.

51. A communications device according to claim 25 wherein the modulator checks the first information sequence for a predetermined level of accuracy wherein the modulated estimate of the first information sequence is not subtracted if the first information sequence does not meet the predetermined level of accuracy.

* * * * *